United States Patent [19]

Kinder

[11] Patent Number: 4,519,902
[45] Date of Patent: May 28, 1985

[54] VIBRATING SCREENING APPARATUS

[75] Inventor: Greever C. Kinder, North Tazewell, Va.

[73] Assignee: Clinch River Corporation, Tazewell, Va.

[21] Appl. No.: 481,902

[22] Filed: Apr. 4, 1983

Related U.S. Application Data

[63] Continuation-in-part of Ser. No. 373,645, Apr. 30, 1982, abandoned.

[51] Int. Cl.³ .............................................. B07B 9/00
[52] U.S. Cl. .................................... 209/234; 209/244; 209/269; 209/275; 209/367; 210/389
[58] Field of Search ............... 209/234, 244, 250, 269, 209/275, 366.5, 367; 210/389

[56] References Cited

U.S. PATENT DOCUMENTS

| | | | |
|---|---|---|---|
| 669,205 | 3/1901 | Messler | 209/244 |
| 1,459,838 | 6/1923 | Mitchell | 209/367 X |
| 1,459,840 | 6/1923 | Mitchell | 209/275 |
| 2,130,346 | 9/1938 | Gerken | 209/250 |
| 2,293,978 | 8/1942 | Jonsson | 209/269 |
| 2,457,018 | 12/1948 | Wantling | 209/269 X |
| 2,585,719 | 2/1952 | Alvord | 209/250 |
| 2,916,142 | 12/1959 | Fontein | 209/274 |
| 3,124,530 | 3/1964 | Jakobs . | |
| 3,446,349 | 5/1969 | Benzon . | |
| 3,491,881 | 1/1970 | Winquist | 209/326 |
| 3,693,793 | 9/1972 | Hahn | 209/326 |
| 3,805,401 | 4/1974 | Fontein | 209/250 X |
| 4,085,040 | 4/1978 | Egan | 209/244 |

FOREIGN PATENT DOCUMENTS

| | | | |
|---|---|---|---|
| 693956 | 7/1940 | Fed. Rep. of Germany | 209/250 |
| 1261092 | 2/1968 | Fed. Rep. of Germany | 209/244 |
| 2053290 | 5/1972 | Fed. Rep. of Germany | 209/366.5 |
| 2348073 | 4/1975 | Fed. Rep. of Germany | 209/269 |
| 540682 | 12/1976 | U.S.S.R. | 209/275 |

OTHER PUBLICATIONS

Brust, "Vibrated Sieves Solve 'Fines' Problem at Prep Plant", *Coal Mining and Processing*, pp. 75–81, (Sep. 1980).

"Coal Preparation", *The American Institute of Mining, Metallurgical, and Petroleum Engineers, Inc.*, Third Edition, 1968, pp. 12–22,23,24,25.

*Primary Examiner*—Kathleen J. Prunner
*Attorney, Agent, or Firm*—Cushman, Darby & Cushman

[57] ABSTRACT

A novel vibratory screening apparatus particularly adapted for the wet-screening of slurry mixtures containing particles and liquids, and more particularly to the separation of solid particles and liquids utilizes in combination a combined vibratory screening deck having a sieve bend portion upstream of an inclined substantially planar portion to effect substantial dewatering of the slurry mixture as it flows across the screening deck.

21 Claims, 10 Drawing Figures

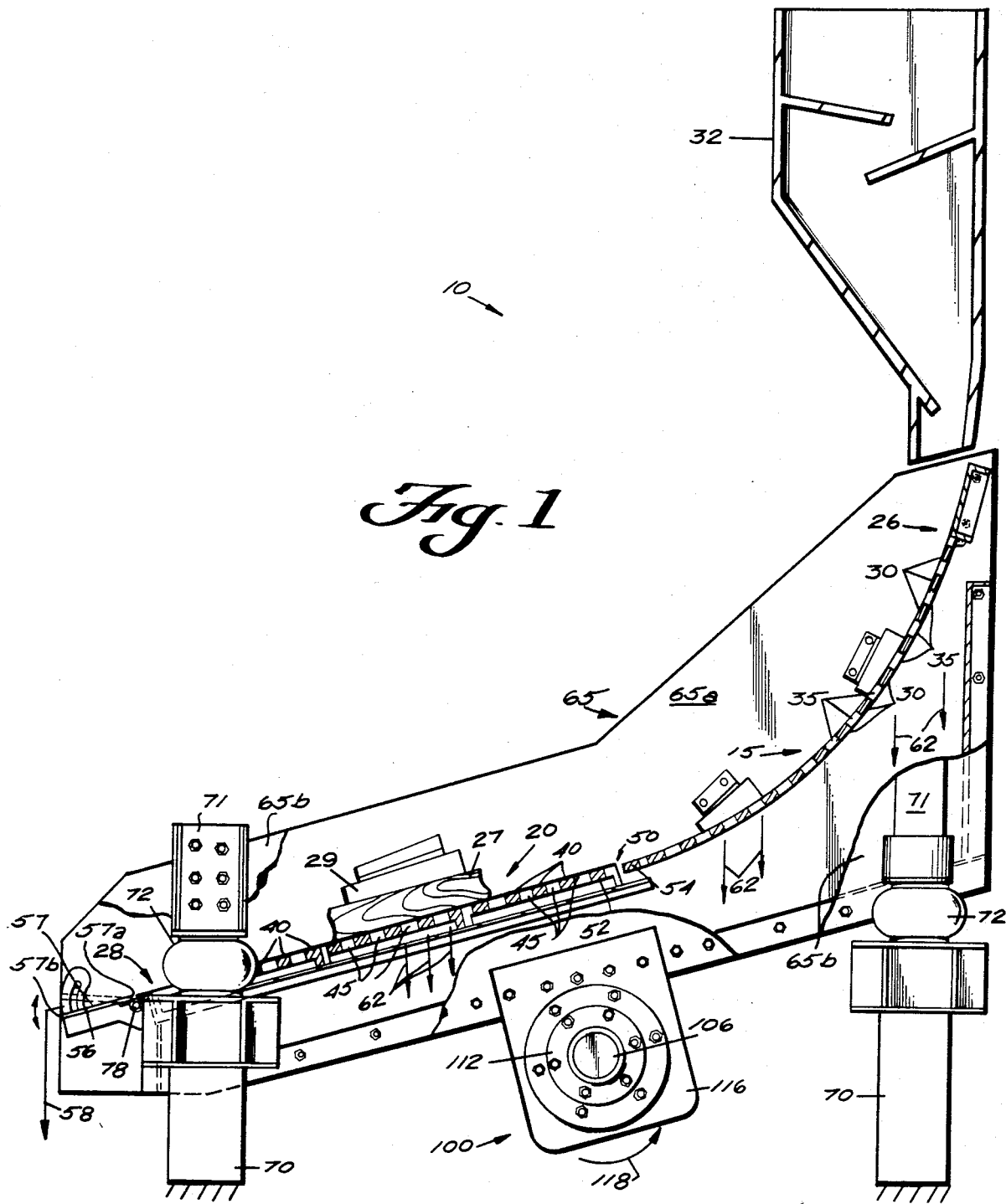

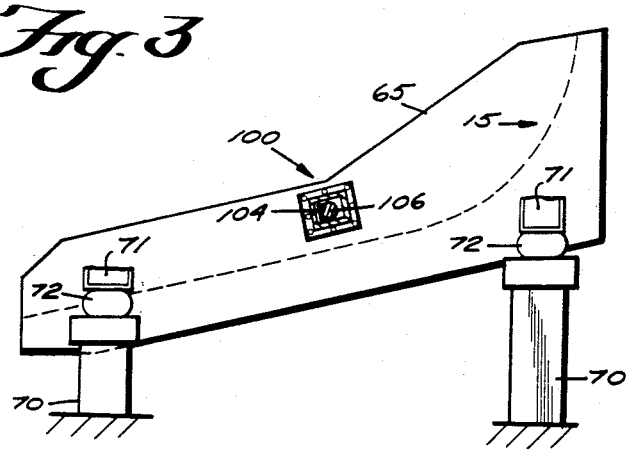
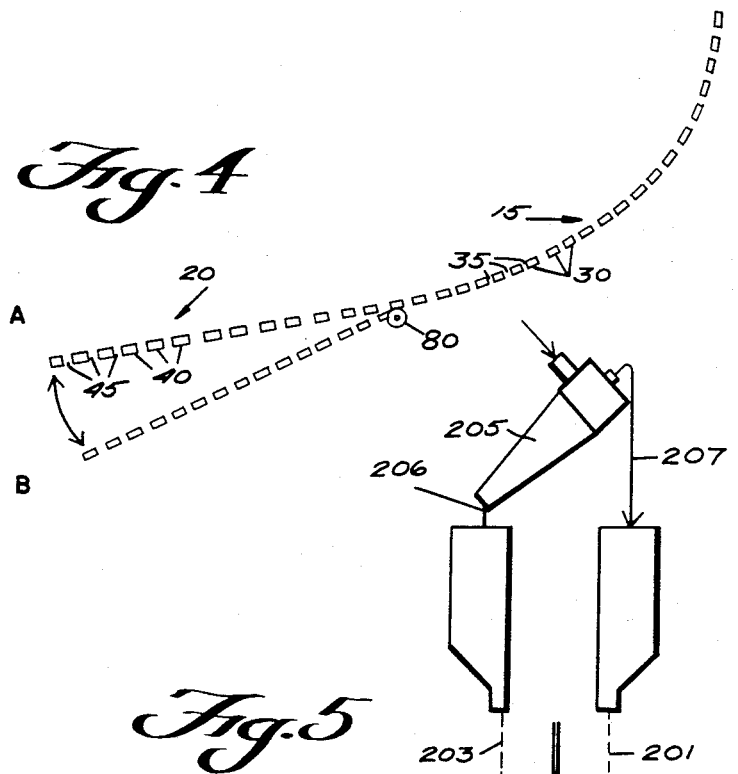
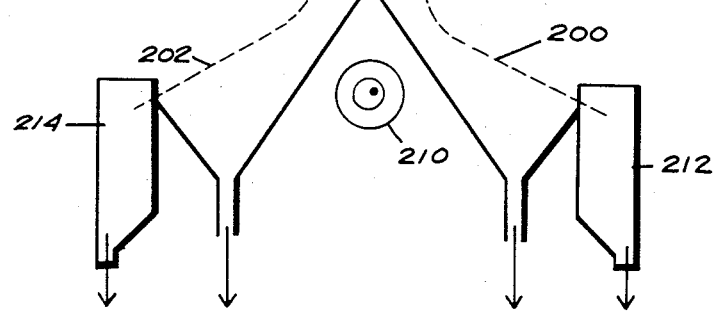

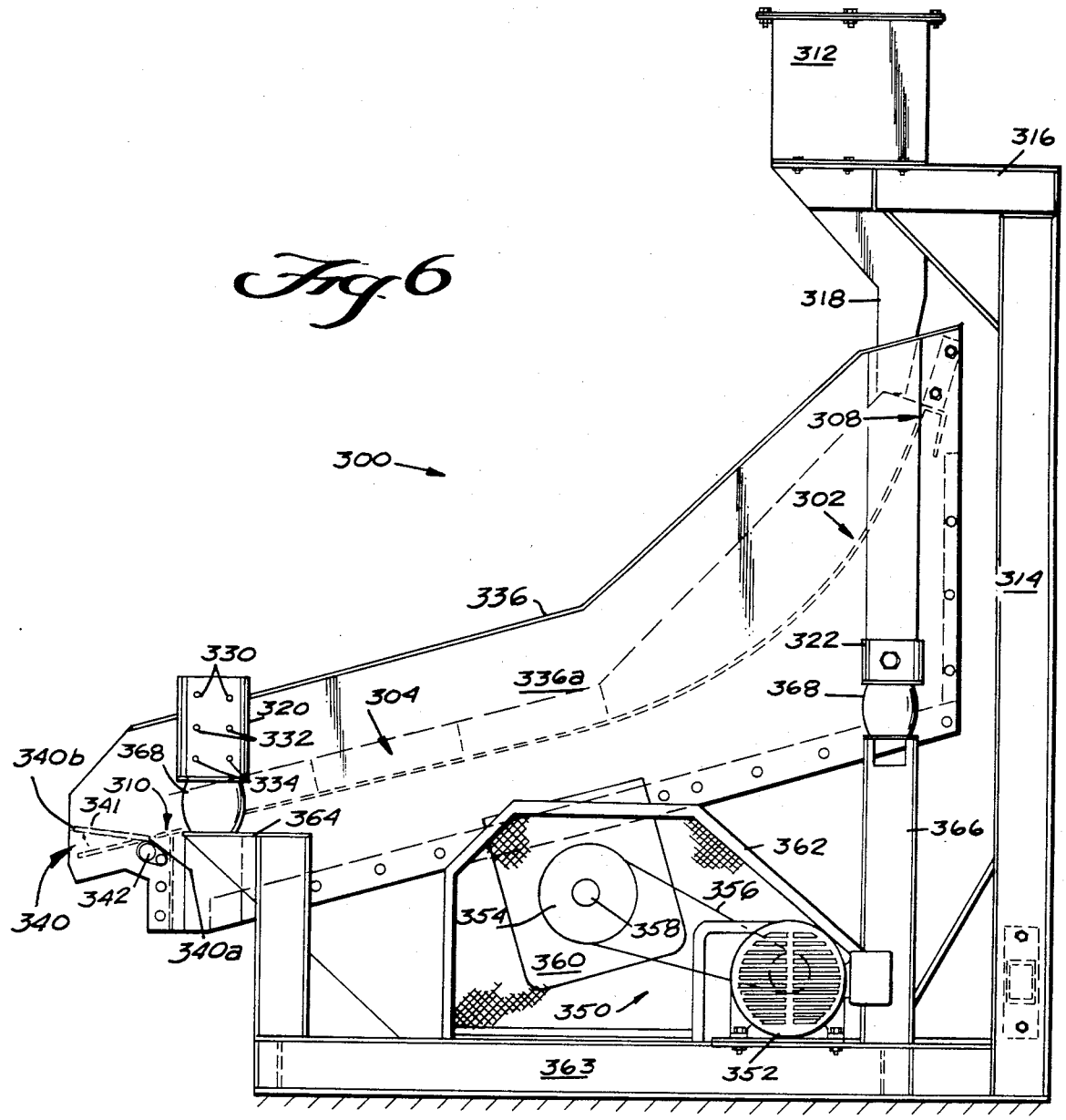

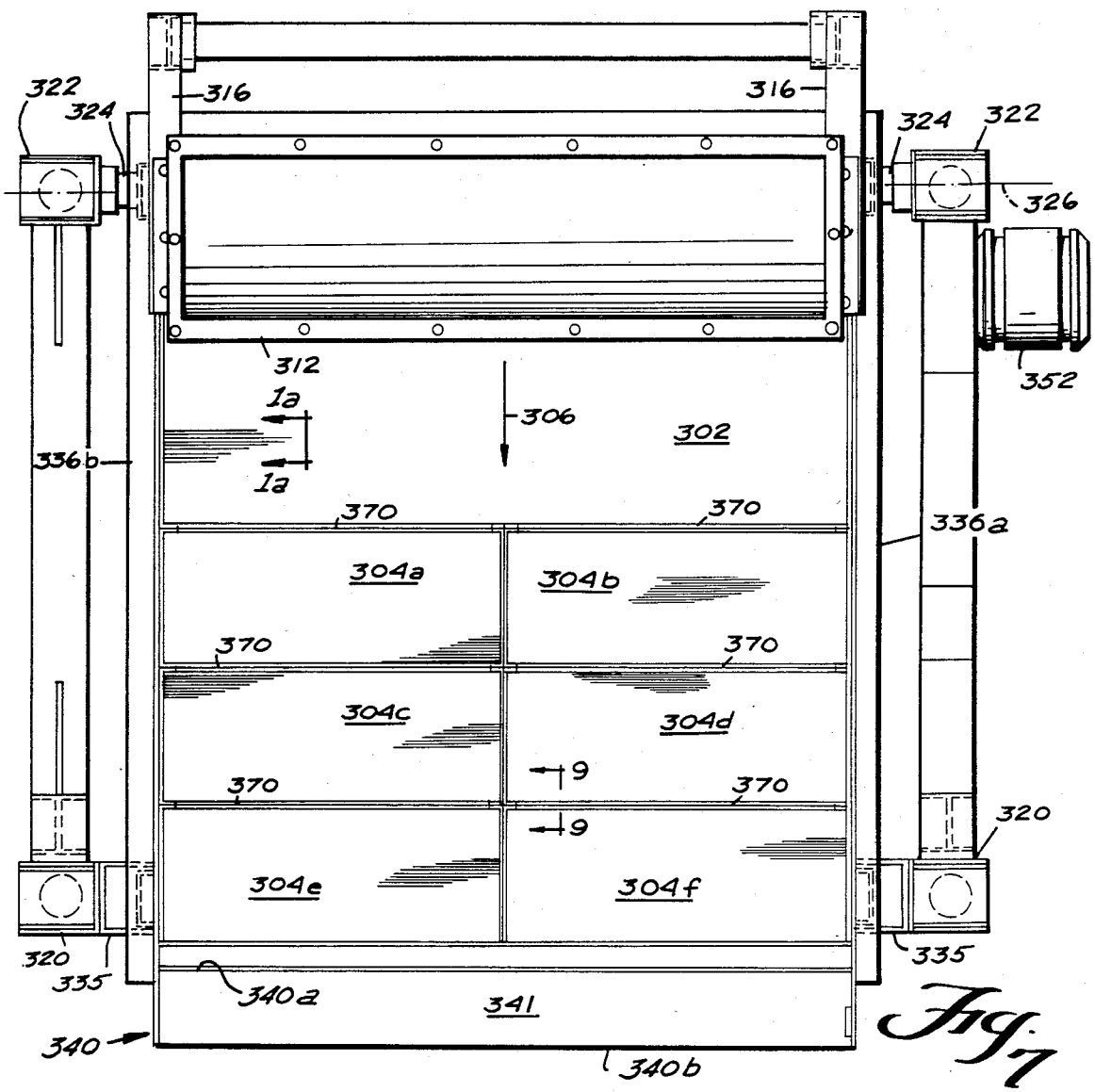
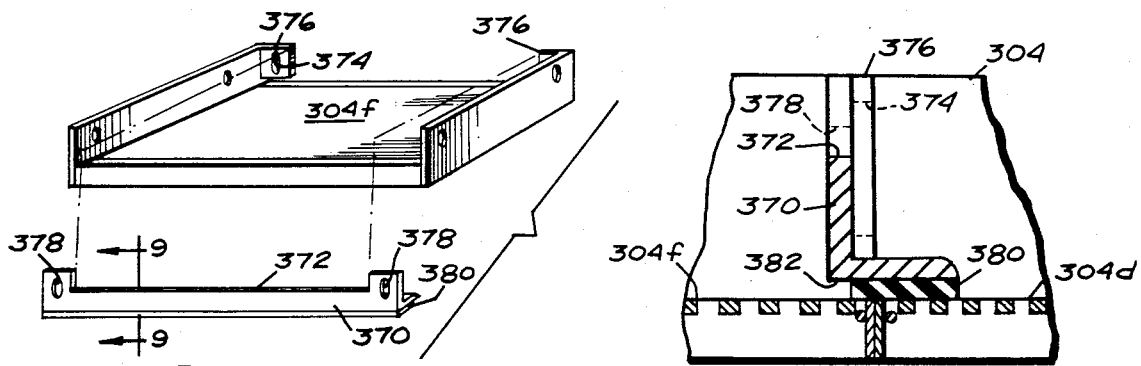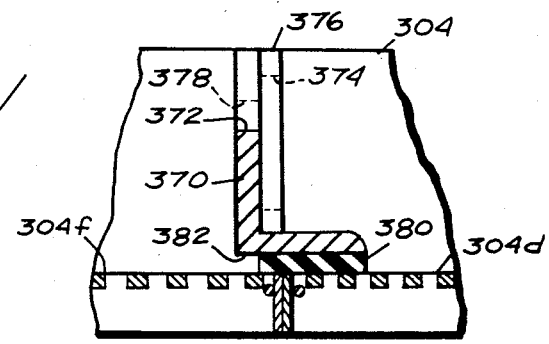

VIBRATING SCREENING APPARATUS

CROSS REFERENCE TO RELATED APPLICATIONS

This application is a continuation-in-part of copending U.S. patent application Ser. No. 373,645 filed Apr. 30, 1982, entitled "Vibrating Screening Apparatus", now abandoned.

BACKGROUND AND SUMMARY OF THE INVENTION

The present invention generally relates to a novel vibratory screening apparatus particularly adapted fo the wet-screening of slurry mixtures containing particles and liquids, and more particularly, to the separation of solid particles and liquids to effect substantial dewatering of the slurry mixture. The novel screening apparatus of the present invention utilizes in combination a combined vibratory screening deck having a sieve bend portion upstream of an inclined substantially planar portion to effect an improved substantial dewatering of a slurry mixture as the slurry flows across the screening deck.

The present invention is particularly useful in dewatering slurry mixtures of fine-grained ore particles, such as fine coal or the like, commonly encountered in coal and ore preparation facilities. Such fine-grained ore particles have intrinsic value, but must be substantially dried, and there is consequently a continued need for improved means to effect maximum separation of the particles and liquid in such slurry mixtures (e.g. to maximize the recovery of fine ore particles freed to a maximum extent of the separated liquid).

Typical coal preparation facilities have conventionally utilized a plurality of sieve bends for such dewatering and separating processes. The dewatered fine coal normally proceeds to further processing, such as driers for removal of additional moisture from the coal fines. However, conventional sieve bends may not remove sufficient water from the fine-grained coal to enable the driers to be operated in the most efficient manner and/or a substantial energy requirement is imposed for operation of such driers. That is, the driers must expend an additional amount of energy to reduce the moisture content of the fine coal feed thereto after it has been dewatered according to conventional devices.

While sieve bends are a well known apparatus utilized for separation and dewatering processes, conventional sieve bends may not separate the desired amount of liquid from coal fines nor attain the degree of separation so as to minimize the amount of coal fines lost to the underflow. The genesis of the sieve bend appears to be U.S. Pat. No. 2,916,142 issued to Freerk J. Fontein, the entire disclosure of which is incorporated herein by reference. According to conventional sieve bend design, the spacing or apertures between the bars of the sieve bend screen deck (arranged perpendicular to the direction of feed) determines the maximum particle size that will pass therethrough. The effective operation of conventional sieve bends is based on achieving a laminar flow of slurry mixture across the surface of the screen deck substantially undistributed since successive bars of the sieve bend engage succeeding layers of the slurry mixture removing water and particles from such layer to a depth of approximately $\frac{1}{4}$ the aperture width, with particles passing therethrough having a diameter of less than $\frac{1}{2}$ the aperture width. Disturbances of the laminar flow have generally been thought to effectively obviate the inherent separating correlation of a sieve bend between particle size and the bar spacing. Thus, sieve bends have not been contemplated in the art as really useful as a vibratory screening apparatus.

It has been proposed to utilize "knocker" or "rapper" devices having an extremely low frequency of timed intervals and at spaced points along the width of the sieve bends as evidenced by U.S. Pat. No. 3,446,349 to Benzon, primarily to dislodge large irregular particles which might get caught in and clog or blind the screen apertures. However, such knocker devices have experienced problems such as damage to the screen deck and the destruction of the correlation between aperture spacing and particle size that will pass therethrough. Rapper sieve bends, therefore, may undesirably allow particle sizes of greater than $\frac{1}{2}$ the aperture width to pass through the screen cloth as underflow. As noted above, in coal fine dewatering processes, such an increase in the particle size that will pass through the screen cloth is unacceptable since the predictable result is that valuable fine coal particles are removed from the product overflow.

It has also been occasionally proposed to utilize very high frequency (e.g. hummer screens) oscillators in the sonic range in conjunction with a flexible filtering screen cloth for dewatering purposes as evidenced by U.S. Pat. No. 3,124,530 to Jakobs. However, the fine mesh flexible screen cloth of conventional hummer screens do not provide the advantageous qualities associated with the rigid bar cloth structure of sieve bends. Accordingly, the ruggedness demanded of equipment utilized in coal processing facilities is often not available when utilizing such conventional hummer screens.

According to the present invention, vibratory movement is utilized in combination with a special screening deck which comprises a combined sieve bend portion and an inclined generally planar screen portion. The present invention is concerned with utilizing vibratory movement between about 800 RPM and 1,200 RPM, preferably in the range between about 900 to 1,100 RPM. According to the present invention the feed end sieve bend portion accepts a slurry feed mixture of particles and liquid in a direction generally perpendicular to the axes of the bars which comprise the screen cloth of the screen deck.

The slurry mixture of particles and liquids is introduced at the feed end of the sieve bend portion and as the slurry flows between the feed end and discharge end thereof, it is effectively partially dewatered. Dewatering is a term applied to the process of removing liquid from a mixture of particles and liquid so that the percentage of liquid in the slurry at the beginning of the dewatering process is much greater than at the end of such process, e.g. from a dilute slurry to a concentrated slurry, and while a minimum of particles passes through to the underflow.

As the slurry becomes dewatered, a transition between particles entrained with liquid and liquid entrained with particles occurs. That is, the weight percent of particles present in the slurry becomes greater as the slurry proceeds across the sieve bend deck between the feed and discharge end. Thus, whereas a dilute slurry is introduced at the sieve bend feed end of the screening apparatus according to the present invention, a substantially but partially dewatered overflow product is obtained after traveling along the predetermined flow path across the sieve bend screen deck. Next, but without interruption, the now concentrated slurry moves onto and builds up on the inclined planar portion of the screen deck. Particularly at this stage it has been found that a very efficient compaction of the solids occurs and that further dewatering of the concentrated slurry now occurs. It is estimated that approximately 20% more liquid can be separated from a slurry when screened with an apparatus according to the present invention relative to conventional dewatering structures, e.g. sieve bends of comparable capacity. This intentional build up of the compacted mass is directly contrary to prior art practices as evidenced by Benzon U.S. Pat. No. 3,446,349 at col. 3, lines 5–8.

Further, the apparatus according to the present invention, due to its more efficient and economical operation, utilizes approximately only twenty-five percent of the floor space area required in a processing facility for a given feed rate when compared to a conventional pure sieve bends installation of comparable capacity. A primary beneficial aspect of the present invention is, therefore, that due to the increased efficiency and capacity a lesser number of devices according to the present invention are necessary to effectively dewater a predetermined flow of dilute slurry feed. Thus, both the initial equipment costs and operating costs are significantly decreased while requiring less floor space area when compared to conventional sieve bends of comparable capacity, and a substantially improved dewatered product is achieved.

An important variation in the use of the vibratory motion is utilized in the present invention. In conventional vibrating screens, the "throw" is customarily so arranged that the particles on the deck are literally "thrown" upward and forward in the direction of the screening flow. This is achieved through the well known balancing and positioning of the eccentric vibratory driving member with respect to the center of gravity of the screen. This conventional mode of operation is not utilized in the present invention; exactly the opposite effect is arranged and desired.

That is, the major vector of the "throw" for the present invention is upwards and backwards against the desired direction of flow of the material. The result is that the flow of the increasingly compacted mass is impeded, as against conventional screening practice, and its movement from feed end to discharge end is more of a sliding motion of the concentrated slurry. The mass is carried downward during the forward movement of the screen, as induced by the eccentric motion, but then as the screen deck is driven upwards and backwards during the "throw" of the eccentric cycle, the inertia of the compacted mass causes it to remain relatively in place and consequently effectively to more or less "slide" further down the screening deck, as the latter moves backwards.

This method of inducing movement of the mass is generally the opposite of normal vibrating screen design and practice, but is essential to achieve the unexpectedly advantageous results provided by the present invention.

Thus, it is one of the primary objects of this invention to provide a more efficient and effective apparatus for the dewatering and/or wet screening of fine grain coal particles over structures and assemblies conventionally being utilized for such purposes.

It is yet another objective of the present invention to provide a novel apparatus which can more effectively dewater and/or wet screen fine grain coal particles utilizing less floor space in a processing facility for a predetermined flow rate in comparison with conventional equipment of comparable capacity.

These and other objects of the invention will become more readily understood by one of ordinary skill in the art upon a reading of the detailed description of the invention while referring to the accompanying drawings.

BRIEF DESCRIPTION OF THE DRAWINGS

FIG. 1 is a cross-sectional elevational view of the preferred exemplary embodiment of a screening apparatus according to the present invention;

FIG. 3 is a cross-sectional elevational schematic depicting another location of the vibrating assembly;

FIG. 4 is a cross-sectional schematic of the planar screen portion adjusting mechanism;

FIG. 5 is a schematic representation of another embodiment according to the present invention.

FIG. 6 is a side elevational view of another embodiment of the screening apparatus according to the present invention;

FIG. 7 is a top plan view of the FIG. 6 embodiment;

FIG. 8 is a perspective view of a representative segment of the planar screen deck according to the present invention; and FIG. 9 is an assembled cross-sectional view of the representative planar screen deck segment taken along line 9—9 in FIG. 7.

DETAILED DESCRIPTION OF THE PREFERRED EXEMPLARY EMBODIMENTS ACCORDING TO THE PRESENT INVENTION

Figure 1A:
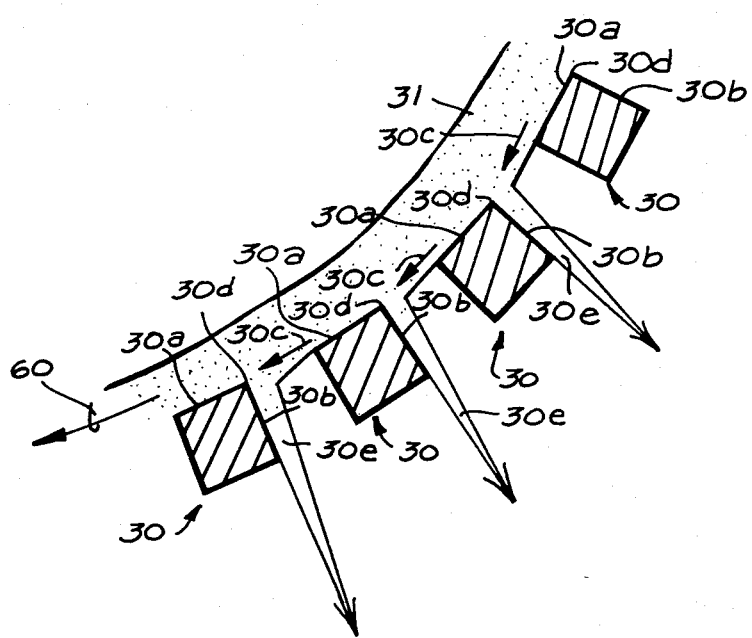
FIG. 1a is a cross-sectional schematic representation of a section of the bars forming the sieve bend portion of this invention taken along line 1a—1a in FIGS. 2 and 7.
Figure 2:
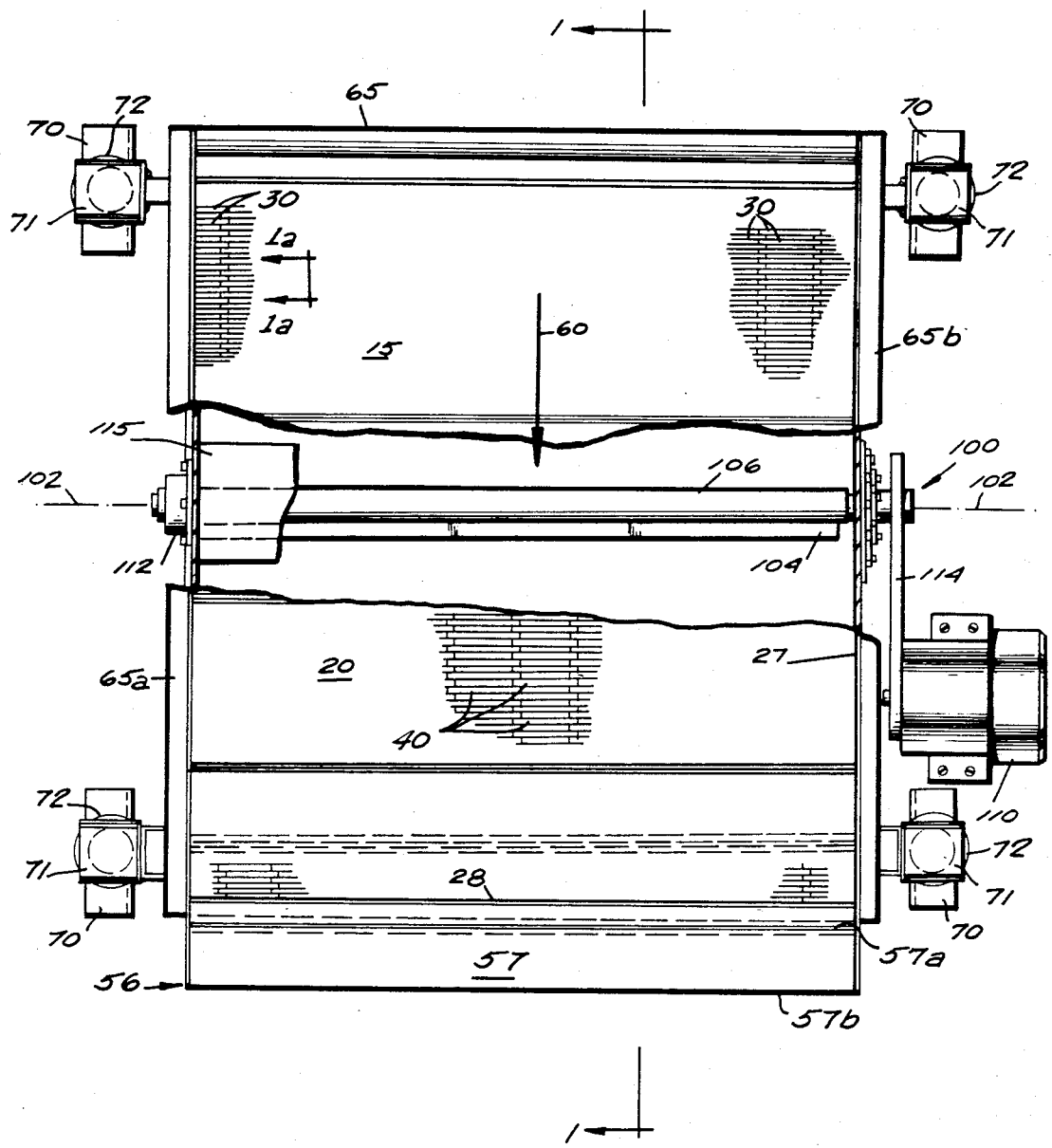
FIG. 2 is a plan view of the embodiment depicted in FIG. 1.

Referring now more specifically to FIGS. 1 and 2, wherein the preferred exemplary embodiment of the present invention is depicted, it will be seen that the screening apparatus generally comprises a combined unitary screen deck 10 including a sieve bend portion 15 upstream of a generally planar screening portion 20.

The sieve bend portion 15 is generally concave having a radius of curvature of between 30 inches to about 40 inches, preferably, about 40 inches and is formed of individual parallel screening bars 30. Bars 30 are preferably fixedly attached with respect to each other so that they form the generatrices of a generally cylindrical surface. Sieve bend portion 15 of the present invention is constructed in accordance with well known sieve bend principals as discussed more fully in U.S. Pat. No. 2,916,142 to Fontein. That is, sieve bend portion 15 preferably consists of bars 30 to form a screening surface which has been bent so that the bars 30 remain straight but the screening surface has been given a curvature in a plane perpendicular to the bars 30.

The sieve bend portion 15 of the present invention thus includes plural separating bars 30 defining therebetween plural respective separating apertures 35. Each bar 30 includes a supporting surface 30a and a separating surface 30b as can be seen more clearly in FIG. 1a. Surface 30a supports one surface of the layer formation flow 31 of particles and liquid to thereby locally define its direction of flow (noted by arrow 30c). Surface 30b, on the other hand, faces in a direction opposing the locally-defined direction of flow. Surfaces 30a and 30b moreover intersect along a line 30d perpendicular to the localized flow (arrow 30c). The separating surface 30b of each bar 30 thereby blocks from the surface of the layer formation flow 31 a thin layer 30e of at most one-quarter of the width of the associated separating aperture 35.

The planar screening portion 20 is preferably similarly composed of elongated screening bars 40 which are preferably similar in nature to bars 30 of the sieve bend portion 15. Preferably, the spacing 45 separating each of the individual bars 40 of the planar screening portion 20 is the same as the spacing 35 between bars 30 of the sieve bend portion 15. However, it should be emphasized that the spacings 35, 45 do not have to be similar; and, for instance, the spacing 45 between the bars 40 could be less than the corresponding distance between bars 30 of sieve bend portion 15. The desired separating spacings 35, 45 will be determined in a given case primarily by the quality and size of the particles in the overflow which are to be dewatered and discharged from the screening apparatus according to the present invention.

The screen deck 10 includes a feed end 26 and a discharge end 28, between which a flow path of a continuously moving slurry mixture is defined. Feed box 32 is positioned above feed end 26 in such a manner that the slurry mixture will preferably be distributed onto the screen deck 10 substantially across the entire width thereof, and in a feed direction perpendicular to the bars 30 but generally parallel to the tangential plane of the deck 10 at its feed end 26.

Planar screen portion 20 and sieve bend portion 15 thus form a continuous unitary screening deck 10 so that a continuous vector flow path thereacross is defined between the feed end 26 and the discharge end 28 as shown by arrow 60 in FIG. 2. The junction 50 between the sieve bend portion 15 and the planar screen deck 20 is preferably such that the space between the two bars 52, 54 of the planar screen portion 20 and the sieve bend portion 15, respectively, are in a face to face relationship and are in general conformance to the spacing 35 defined between each of the individual bars 30. However, distances less than those between bars 30 of sieve bend portion 15 can be advantageously utilized. Accordingly, it is conceivable for instance that bars 52, 54 can be in a face to face relationship with a minimal space therebetween or in a touching arrangement.

The planar screen portion 20 is positioned relative to the sieve bend 15 so that a generally continuous vector flow path (noted by arrow 60 in FIG. 2) is defined which is preferably generally perpendicular to the individual bars 30, 40 of sieve bend portion 15 and planar screen portion 20, respectively. The planar screen portion 20 is positioned in a manner which is inclined such that the slurry which flows thereacross will proceed along a sloped path in the direction of the vector flow. However, the angle which the planar screen portion 20 forms with the horizontal plane is less than the angle of repose of the accumulated wholly or partially dewatered product to be discharged. Because of this minimum angle, gravity flow of this material is substantially absent and its movement across the deck portion 20 is instead induced by the vibratory motion described hereinafter. This feature affords a very desirable holdup of the material to be dewatered such that an efficient additional loss of slurry liquid is effected.

While a unitary assembly is possible, it is commercially preferable to fabricate the planar screen portion 20 as a predetermined number of discrete removable units. Thus, as wear is experienced upon one or more units, such units can be economically replaced with similar units without necessitating removal of the entire planar screen portion 20. Also, since the upstream bars 40 tend to become worn at a faster rate than the downstream bars 40, the discrete units may be rotated thereby prolonging the useful life of each unit. To this end, a conventional wedge assembly which comprises wooden members 27 and clips 29 are provided to securely, yet removably, hold the units in place relative to partial housing 65.

As the dilute slurry is tangentially distributed onto the feed end 26 of the sieve bend portion 15 by means of feed box 32 and travels along the vector flow path toward discharge end 28, a substantial portion of the liquid passes through the spacings 35, 45 thereof as noted by arrows 62. As the coal particles entrained with the fluid in the dilute slurry proceed along the vector flow path, and as substantial dewatering occurs, the slurry undergoes a transition such that in effect the liquid is entrained with the coal as opposed to the coal being entrained with the liquid. That is, as the slurry flows between the feed and discharge ends of the screen deck, a transition between dilute slurry and concentrated somewhat compacted slurry occurs.

At the end of the screening deck there is provided a discharge lip 56 which directs the dewatered coal (noted by arrow 58) into a suitable apparatus for delivery to further processing, e.g. drying. Discharge lip 56 generally defines a surface 57 to establish an interface between the accumulated particle mass (not shown) and the upstream edge 57a. Portions of the accumulated particle mass will thereafter pass over downstream edge 57b and be directed to further processing.

Partial housing frame 65 includes opposing side walls 65a, 65b, respectively, and an open top and bottom. Partial housing frame 65 (and thus screen deck 10) is suitably mounted by opposing rigid mounting legs 70, 71 for bearing the weight of the screening apparatus. Support structures 72 suitable for withstanding and transmitting vibratory movement over sustained periods of time are disposed between the rigid mounting legs 70, 71 and frame 65 so as to enable the screen deck 10 to respond to vibratory movement. Suitable conventional support structures 72 (such as, pneumatic springs, compressible rubber or the like) can be satisfactorily utilized to support the screening apparatus while, concurrently, allowing vibratory movement thereof.

An important aspect of the present invention is the use of vibratory movement in conjunction with the screen deck 10. Vibratory movement can be imparted to the screening apparatus by means of any suitable driven eccentric device, which are already known of themselves in the art of conventional vibratory screens.

A suitable vibrating drive assembly 100 depicted in FIGS. 1 and 2 is of the eccentric type in that an axis of rotation 102 is offset relative to the weighted portion 104 on shaft of the drive assembly 100. As the shaft 106 rotates around the axis of rotation 102 (FIG. 2) the weighted portion 104 attached thereto will be concurrently rotated thereby causing an inertial vibratory response to be imparted to the screening apparatus. This force imparted to the screeing apparatus is generally termed the "throw" of the vibrating drive assembly. Generally, throw in normal art parlance is used to designate the quantum of vibrational force imparted to the screen to cause a responsive movement of material over the screen deck. According to the present invention, a "throw" of about 3/16 inch is preferable. However, the screen according to the present invention can be advantageously utilized with a "throw" between the range of about 1/16 to ⅜ inches. As noted above, the effective vibrational frequency for use in the present invention is in the range between 800 RPM to 1,200 RPM, preferably about 900 to 1,110 RPM.

Drive assembly 100 further creates a major vector of the "throw" in a direction which is upwards and backwards relative the vector flow path (e.g. upwards and backwards relative to arrow 60 in FIG. 2) of the slurry mixture over the unitary screen deck 10. This result in the slurry mixture becoming increasingly compacted while its flow in the direction of arrow 60 is partially impeded across the planar screen portion 20 so as to establish a concentrated slurry mixture thereat having a greater depth in the vicinity of the discharge end 28 and gradually decreasing in an upstream direction. In such a manner, further advantageous compaction of the solids and dewatering of the slurry mixture will occur.

The drive assembly 100 generally includes a motor 110 and a shaft 106 and a weighted portion 104 affixed thereto extending across the entire width of the screening deck 10. Shaft 106 is supported for rotary movement in bearing housings 112. Conventional drive belts 114, for example, can be provided as the transferring mechanism for transferring the rotational driving movement of motor 110 to shaft 106. A protective enclosure 115 is provided around the shaft 106 and weighted portion 104 to protect them from the processing environment and particularly from the liquid component removed from the slurry mixture as it travels across the screening deck. Suitable rigid structural members 116 are provided to mount shaft 106 below the apparatus as shown in FIG. 1. In such a manner, shaft 106 will be caused to rotate in a predetermined direction thereby transferring vibratory movement to the screening deck. In the shaft positioned as in FIGS. 1 and 2 the direction of rotation will be counterclockwise, as seen from arrow 118 in FIG. 1.

The eccentric drive assembly 100 depicted in FIGS. 1 and 2 is shown as being generally located below the center of gravity of the apparatus. However, in FIG. 3 there is schematically depicted another location for the eccentric drive assembly 100. Thus, in FIG. 3, the eccentric drive assembly 100 can be mounted generally centrally located with respect to the center of gravity of the apparatus as shown. When the eccentric drive assembly 100 is located below the screening apparatus, as in FIGS. 1 and 2, shaft 106 may be directly mounted between housing frame 65 for rotary movement in bearing housing 112. As in the embodiment depicted in FIGS. 1 and 2, the embodiment of FIG. 3 utilizes mounting legs 70 to bear the weight of the screening apparatus and support structures 72 for permitting vibratory movement of the apparatus over sustained periods of time.

Referring now more specifically to FIG. 1, the discharge lip 56 generally extends from the discharge end 28 of planar screen portion 20, upstream edge 57a being mounted adjacent to discharge end 28. A suitable hinge assembly 78 can be provided which will permit the discharge lip 56 to be adjustably moved to a predetermined position (shown by dashed line in FIG. 1) and securely locking it in place. Thus, an angular inclination of discharge lip 56 can be selected, which inclination places surface 57 in a direction opposing the general path of conveyance (arrow 60 in FIG. 2) of the slurry mixture across the screen deck 10. In such a manner, depth of accumulation of the particle mass layer can be selected, the depth being greatest at the interface between such particles and the upstream edge 57a of discharge lip 56 while such thickness of the particle mass layer will greatly decrease upstream thereof. The development of the thicker layer will afford further compaction of the moist mass.

As noted above, the incline of planar screen deck 20 is generally less than the angle of repose of product to be discharged. However, depending upon the moisture content of the discharged product or the desired separation thereof, this angle may be adjusted so that the angle deviates to a greater or lesser degree from the angle of repose. Thus, there may be provided an adjustable mechanism 80, such as a hinge or the like, associated with the planar screening portion 20 such that the incline that it forms with respect to horizontal can be selectably adjusted. As depicted in FIG. 4, the planar screening portion 20 can be adjustable over a range of inclined positions between position A (the angle of repose) and position B which is less than the angle of repose. Suitable structures, such as locking pins or the like (not shown) can be provided to securely position the planar screen portion 20 in a predetermined desired inclined relationship.

Referring now more specifically to FIG. 5, wherein an additional embodiment of the present invention is schematically depicted, it is readily apparent that two screening apparatuses according to the present invention are provided in a back-to-back relationship. Here feed end 201, 203 of each screen apparatus may be fed by a separating cyclone 205 so that the slurry underflow 206 thereof is delivered to one screen 202 and the overflow slurry 207 is delivered to the other (right-hand as shown) screen 200. In such an arrangement, it will be appreciated that only one vibrating drive assembly, schematically shown as 210 but rigidly connected to both screen decks 200, 202, need be provided in order to provide a harmonic and synchronized vibratory movement to both screening apparatuses 200, 202. Thus, as the respective slurry mixtures flow from the feed ends to the discharge ends of each screen deck, each is similarly separated according to particle size and also dewatered such that the moisture content of the particles which are discharged from each screening apparatus at 212, 214 is substantially reduced.

Of course, two separate cyclones may be provided each for feeding a predetermined one of screens 200, 202. In such arrangement, either the underflow of each, the overflow of each or some predetermined combination could be fed to the respective screen 200, 202 so as to effect any predetermined degree of desired separation.

Another exemplary embodiment of the present invention can be seen by referring to accompanying FIGS. 6-7. The combined unitary screen deck 300 once again includes a sieve bend portion 302 and planar screening portion 304 which are disposed relative to one another so that a generally continuous vector flow path (noted by arrow 306 in FIG. 7) is defined between the feed end 308 and the discharge end 310 of screen deck 300.

Feed box 312 is fixed relative to feed end 308 by suitable structural support members 314, 316 so that the feed box 312 will be relatively undisturbed during vibratory movement of screen deck 300. A discharge chute 318 is preferably utilized to ensure that the slurry mixture is distributed across substantially the entire width of screen deck 300 so as to enhance the separatory function thereof.

The screen deck 300 is itself supported for vibratory movement by front and rear pairs of support members 320, 322, respectively. As briefly noted above with respect to the FIGS. 1 and 2 embodiment, it is highly desirable to permit selection of the inclination of screen deck 300 relative to a horizontal plane. To accomplish such selective adjustment of the inclination, the screen deck 300 is mounted to the rear support members 322 via axle rod 324 (see FIG. 7) so that pivotal movement during installation and/or inclination adjustment of screen deck 300 about axis 326 is permitted. Thus, axle rod 324 fixes the screen deck 300 to rear support members 322 while yet permitting the front portion of screen deck 300 to be vertically displaced during installation and/or during inclination adjustments after installation by virtue of the pivotal movement of deck 300 about axis 326.

To mount the front portion of deck 300 for operation, plural paired apertures 330, 332 and 334 are registered with a pair of mounting apertures (not shown) defined in mounting posts 335 rigidly attached to the opposing sidewalls 336a, 336b, respectively, of partial housing 336. Thereafter screen deck 300 is rigidly secured to front support members 320 by utilizing conventional securing means, such as bolt and nut arrangements or the like while one pair of the apertures 330, 332 or 334 is registered with the mounting apertures of posts 335. Preferably, the uppermost and lowermost pairs of apertures (e.g. aperture pairs 330 and 334, respectively, in FIG. 6) define a range of pivotal movement about axis 326 so that the fixed angle that planar screen portion 304 forms with a horizontal plane during operation is selectable between about 18° to about 12°, respectively. More preferably, however, deck 300 is mounted to front and rear support members 320, 322 so that planar screen portion 304 forms an angle of about 15° relative to a horizontal plane.

Although only three pairs of apertures are shown in FIG. 6 to accomplish the inclination adjustment functions described above, the reader should appreciate that more or less pairs of apertures could also be provided. Of course, front and rear supports 320, 322 could be welded to deck 300 in the first instance at the desired inclination angle of planar portion 304 relative to horizontal in which case no inclination adjustment would be possible. Adjustability of the angular inclination of planar portion 304 is, however, preferred as this permits the operators of screen deck 300 to select the proper depth of material build-up (e.g. "bed depth") on planar portion 304 so that the induced vibratory movement of deck 300 causes additional loss of slurry water to an optimum degree.

Further control of the material bed depth upon planar portion 304 can be achieved utilizing hinged discharge lip 340 having upstream and downstream edges 340a, 340b, respectively, edge 340a being disposed adjacent to discharge end 310 substantially along the entire width thereof. Preferably lip 340 defines a surface 341 and is pivotable about hinge 342 so that it can be locked at an angular inclination relative planar screen portion 304 in a direction opposing the general vector path (arrow 306) of the slurry mixture across the screen deck 300. Thus, the opposite inclination of surface 341 of discharge lip 340 will further encourage material build-up on planar screen portion 304 and the depth of such material build-up can be selectively adjusted by pivoting discharge lip 340 about hinge 342 and locking it in the desired angular orientation. Preferably, discharge lip 340 is pivotably movable between angular orientations relative to planar screen portion 304 in the range of about 0° (e.g. the position wherein discharge lip 340 is substantially coplanar with planar screen portion 304) and about 30°, although greater or lesser angular relationships could be provided.

The drive assembly 350 is similar to that described above with respect to the FIGS. 1 and 2 embodiment in that a motor 352 is connected to pulley 354 via a drive chain or belt 356 so that shaft 358 can be drivenly rotated. Shaft 358 is preferably an eccentric type having a weighted potion offset relative to its central axis so that the desired "throw" can be imparted to screen deck 300. Shaft 358 is journally mounted to support 360, the latter being rigidly fixed to sidewalls 336 so that the "throw" produced by the rotation of eccentrically weighted shaft 358 will be mechanically transferred to screen deck 300. Preferably, a wire mesh guard 362 houses most of the operative mechanisms of drive assembly 350 for safety reasons.

Screen deck 300 is mounted to the rigidly fixed lower support assembly 363 so that the weight of the former is borne by the latter. Lower support assembly 336 includes front and rear pairs of mounting legs 364, 366 which are respectively oriented in a substantially opposing relationship relative front and rear support members 320, 322. Support structures 368 are disposed between each of front mounting legs 364 and their respective front support members 320, and rear mounting legs 366 and their respective rear support members 322 for withstanding and transmitting vibratory movement over sustained periods of time so as to enable screen deck 300 to respond to vibratory movement imparted thereto by virtue of drive assembly 350. Support structures 368 can be any conventional type (e.g. pneumatic springs, compressible rubber or the like) which support the screening apparatus while yet permitting vibratory movement thereof.

The slurry mixture initially deposited onto the feed end 308 travels across sieve bend portion 302 in a direction noted by arrow 306 in FIG. 7. Thus, since each of the separated bars comprising the screening surface of sieve bend portion 302 transversely extends between sidewalls 336a and 336b, the flow direction of the slurry mixture will be substantially perpendicular to the separated bars of sieve bend portion 302. As the slurry mixture travels over the sieve bend portion 302 along the vector flow path, substantial initial dewatering will occur. Thereafter, as the partially dewatered mixture continuously flows onto the planar screen portion 304, a mass build-up of material thereon is caused so as to enable further dewatering thereof as the compacted mass is relatively forwardly advanced and vertically compacted due to the vibratory movement of screen deck 300.

To further enhance mass build-up of material as it moves across the planar screen portion 304, plural damming structures 370 (see, FIGS. 8 and 9) are fixed to discrete planar screening segments (e.g. 304a–304f in FIG. 7) substantially transverse to the vector flow (arrow 306) of material thereacross. Thus, damming structures 370 (only one structure 370 is shown in FIG. 8 as being operatively associated with one segment 304f for ease of presentation) provide an impediment to the flow of material advancing across the screen deck from sieve bend portion 302 to planar screen portion 304 so that localized transverse areas of material build-up on the upstream side of structures 370 is established. Damming structures are preferably mounted along the upstream edge of each segment 304a–304f so that a relatively continuous impediment to material flow extends across substantially the entire width of deck 300.

An upper edge 372 establishes the uppermost dimension of the depth of material build-up against the upstream surface of structures 370 since a portion of the material will continuously flow over edge 372 and be deposited downstream of structure 370 and thus continue to proceed along planar screen deck 304. The height of edge 372 above the surface of planar screen portion 304 is preferably adjustable so that the depth of the localized transverse material beds established by structures 370 can be preselected depending upon certain processing parameters such as the particle size utilized and the final desired dewatering thereof. Adjustability of damming structures 370 is provided by elongated apertures 374 defined in flanges 376. Apertures 374 are registrable with apertures 378 defined in the distal ends of each damming structure 370 so that when damming structures 370 are properly installed, a bolt/nut arrangement (not shown) can pass therethrough so as to rigidly fix one to another (see FIG. 9). The elongation of apertures 374 permit selective adjustment of the vertical dimension at which edge 372 is disposed above the planar screen portion 304 so that the depth of material build-up on the upstream side of damming structures 370 can be preselected. Preferably a gasket 380 of suitable elastomeric material (e.g. rubber, neoprene or the like) is provided on the bottom surface 382 of damming structures 370 so as to seal any space which may be present between adjacent panel segments (e.g. 304f and 304d in FIG. 9).

The advantages of utilizing the present invention will become more apparent after consideration of the following nonlimiting example.

EXAMPLE

The performance of a screening device in accordance with the present invention was analyzed after installation in an operating coal preparation plant in Western Virginia in order to determine the percent moisture which is removed and determine the percent solids recovery. The screening surface of the vibratory screening device in accordance with the present invention was a Norris Profile 3/32 Iso Rod having a feed end sieve bend portion of 40 inch radius 60°-½ mm openings followed by 44 inches of a planar screening portion on 15° slope-½ mm opening. The slurry feed samples to the device was 28×0 mesh coal at 55.8% concentration (i.e. 44.5% surface moisture). Two identical feed samples were introduced at the feed end of the vibrating screening device and the data for both samples were averaged. The average results appear in the following Table I.

TABLE I

| ANALYSIS SIEVE OPENING (MESH) | (A) FEED TO VIBRATING SCREEN 55.48% SOLIDS 44.52% H₂O | | (B) OVERFLOW PRODUCT 36.40% H₂O | | (C) UNDERFLOW (FINES) 56.42% H₂O | |
|---|---|---|---|---|---|---|
| | % BETWEEN SIEVES | CUM. % | % BETWEEN SIEVES | CUM % | % BETWEEN SIEVES | CUM. % |
| 28 | 12.8 | 12.8 | 14.4 | 14.4 | 8.8 | 8.8 |
| 48 | 46.8 | 59.6 | 48.7 | 63.1 | 42.8 | 51.6 |
| 65 | 31.1 | 72.7 | 14.6 | 77.7 | 14.0 | 65.6 |
| 100 | 7.8 | 80.5 | 8.2 | 85.9 | 8.6 | 74.2 |
| 170 | 7.4 | 87.9 | 6.3 | 92.2 | 8.9 | 83.1 |
| 200 | 2.3 | 90.2 | 1.8 | 94.0 | 3.0 | 86.1 |
| PAN | 9.8 | 100.0 | 6.0 | 100.0 | 13.9 | 100.0 |
| TOTAL | 100 | | 100 | | 100 | |

Based upon the data compiled in the above Table I, it was calculated that 71.43% of the solids introduced onto the screening surface were recovered (e.g. the percentage of coal which was discharged as overflow from the device). Thus, the test results showed that when a slurry feed of 28×0 mesh coal with 44.52% surface moisture was introduced onto a vibratory screening device in accordance with the present invention, the surface moisture was reduced 8.12% to 36.40% surface moisture while the recovery of solids was 71.43 percent.

It will therefore be appreciated after consideration is given to the above Example that utilization of the vibratory screening apparatus of the present invention provides distinct advantages over prior conventional screening devices. For example, dryers are normally utilized after the dewatering equipment in most coal preparation facilities to remove the residual liquid from the coal particles. Since such dryers use large amounts of energy during operation, it becomes extremely important from an economical viewpoint to remove as much of the liquid content of the slurry mixture as possible during dewatering operations so that the energy load on the dryers which subsequently accept the dewatered slurry will similarly be reduced. Thus, those in the art have continually sought to improve the dewatering capabilities of coal processing equipment.

It is also extremely important to recover to a maximum extent the desired size of coal particles since they have intrinsic value. The present invention therefore significantly enhances the desired performances for separatory equipment since improved dewatering capability exists concurrently with high recovery of the desired size coal particles with minimum fine coal being lost to the underflow. Indeed, by utilizing the present invention, smaller sized dryers may be efficiently operated thereby decreasing not only the fuel costs associated therewith, but also the initial equipment cost. Thus, from an economic viewpoint, the vibratory screening device of the present invention presents a distinct advance in the art when compared to conventional separator devices.

While the present invention has been herein described in what is presently conceived to be the most preferred embodiments thereof, it should be apparent to one of ordinary skill in the art that many modifications may be made thereof within the spirit and scope of the invention, which scope is to be accorded the broadest interpretation of the appended claims so as to encompass all equivalent structures and assemblies.

What I claim is:

1. A vibratory screening apparatus comprising:

feeding means for feeding a layer formation flow of a dilute slurry mixture of particles and liquid;

a screen deck defining a generally unitary surface having a feed end adapted for receiving said dilute slurry mixture and a discharge end for discharging a substantially concentrated slurry mixture thereover, said feed and discharge ends defining therebetween a vector flow path along which said slurry mixture will flow as it continuously moves from said feed end to said discharge end, said screen deck including downstream from said feed end an initial sieve bend portion and in a subsequent substantially contiguous downstream position an inclined screen portion wherein said sieve bend portion includes plural first longitudinal separating bars fixedly attached with respect to one another, each of said first bars having (i) a supporting surface for engaging one surface of the layer formation flow of particles and liquid passing thereby to define a local direction of flow thereof along said vector flow path, the supporting surfaces of said first bars between said feed end and said inclined screen portion generally conforming to a relatively smooth cylindrically curved plane having a predetermined radius, each of said first bars also having (ii) a separating surface facing in a direction opposed to the local direction of flow and disposed in a transverse plane intersecting a plane of the associated supported surface along a line perpendicular to the local direction of flow, the separating surface of each first bar being spaced from the adjacent upstream first bar to define therewith a first separating aperture having a substantially constant width dimension as measured in the local direction of flow, and wherein said feeding means feeds said particles and liquid in layer formation onto the feed end of said screen deck in a direction substantially tangential to said generally conforming plane of the supporting surface and perpendicular to said intersecting line of the separating surface of the first bars adjacent thereto, the flow of the slurry mixture across the supporting surface of each first bar along said vector flow path being such that the separating surface of a succeeding first bar which defines therewith an associated first separating aperture will block from the surface of the layer formation flow engaged by the supporting surface a thin layer of a thickness at most of the order of one-quarter of the width of the associated first separating aperture so that the liquid in successive blocked layer together with at least a portion of the particles entrained therein will pass through the associated first separating apertures and the remaining liquid and particles will pass on to the inclined screen portion of said screen deck; and wherein said inclined screen portion includes plural second longitudinal separating bars fixedly attached with respect to one another and spaced apart relative to said vector flow thereby defining second separating apertures between successive said second bars, said second bars between said sieve bend portion and said discharge end defining a generally planar separation surface;

means for fixedly mounting said sieve bend and inclined screen portions with respect to each other and for mounting said combined screen deck to permit for vibratory movement thereof; and vibratory means for imparting vibratory movement to said screen deck such that a major vector of said vibratory movement is generally upwards and backwards relative to said vector flow path to effect substantial separation of said liquid from said particles.

2. An apparatus as in claim 1 wherein said predetermined radius of curvature is between about 30 inches to about 40 inches.

3. An apparatus as in claim 1 wherein said mounting means comprises a partial housing fixed to said screen deck, first mounting leg means fixed attached to said partial housing for supporting said screen deck; and means disposed between said first and second mounting leg means for allowing said screen deck and said first mounting leg means to vibrate.

4. An apparatus as in claim 1 wherein said vibratory means comprises an eccentric vibrating assembly.

5. An apparatus as in claim 4 wherein said eccentric vibrating assembly comprises means for eccentrically weighting an elongated shaft and means for rotating said shaft in a predetermined direction.

6. An apparatus as in claims 4 or 5 wherein said vibrating means is generally mounted centrally with respect to said screen deck.

7. An apparatus as in claims 4 or 5 wherein said vibrating means is mounted below said screen deck and includes structural means for transferring vibratory movement to said apparatus.

8. An appratus as in claim 1 wherein said inclined screen portion is inclined in a direction opposite said vector flow path at an angle relative to horizontal which is less than the angle of repose for said slurry mixture.

9. An appratus as in claim 1 or 8 wherein said inclined screen portion further includes means for adjusting the angle of said inclined screen portion between the angle of repose of said slurry mixture and horizontal.

10. An apparatus as in claim 1 wherein said first apertures have a predetermined first width as measured in the direction of said vector flow path.

11. An apparatus as in claim 10 wherein said second apertures have a predetermined second width as measured in the direction of said vector flow path.

12. An apparatus as in claim 11 wherein said first width is generally equal to said second width.

13. An apparatus as in claim 11 wherein said first width is not greater than said second width.

14. A vibratory apparatus as in claim 1 wherein said inclined screen portion includes flow-impeding means disposed substantially transverse to said vector flow path for establishing at least one localized area of partial impedance to said slurry mixture as it flows along said vector flow path and for establishing, along said localized area, a mass build-up of said slurry mixture having a preselected depth for enhancing removal of said fluid from said slurry mixture.

15. A vibratory screening apparatus for removing liquid from a feed of dilute slurry mixture so that a concentrated slurry mixture is discharged therefrom, said apparatus comprising:

feeding means for feeding a layer formation flow of a dilute slurry mixture of particles and liquid;

a screen deck defining a generally unitary surface having a feed end adapted for receiving said dilute slurry mixture and a discharge end of discharging a substantially concentrated slurry mixture thereover, said feed and discharge ends defining therebetween a vector flow path along which said slurry mixture will flow as it continuously moves from said feed end to said discharge end, said screen deck including downstream from said feed end an initial sieve bend portion and in a subsequent substantially contiguous downstream position an inclined screen portion wherein said sieve bend portion includes plural first longitudinal separating bars fixedly attached to one another, each of said first bars having (i) a supporting surface for engaging one surface of the layer formation flow of particles and liquid passing thereby to define a local direction of flow thereof along said vector flow path, the supporting surfaces of said first bars between said feed end and said inclined screen portion generally conforming to a relatively smooth cylindrical curved plane having a predetermined radius, each of said first bars also having (ii) a separating surface facing in a direction opposed to the local direction of flow and disposed in a transverse plane intersecting a plane of the associated supporting surface along a line perpendicular to the local direction of flow, the separating surface of each first bar being spaced from the adjacent upstream first bar to define therewith a first separating aperture having a substantially constant with dimension as measured in the local direction of flow, and wherein said feeding means feeds said particles and liquid in layer formation onto the feed end of said screen deck in a direction substantially tangential to said generally conforming plane of the supporting surface and perpendicular to said intersecting line of the separating surface of the first bars adjacent thereto, the flow of the slurry mixture across the supporting surface of each first bar along said vector flow path being such that the separating surface of a succeeding first bar which defines therewith an associated first separating aperture will block from the surface of the layer formation flow engaged by the supporting surface a thin layer of a thickness at most of the order of one-quarter of the width of the associated first separating aperture so that the liquid in successive blocked layers together with at least a portion of the particles entrained therein will pass through the associated first separating apertures and the remaining liquid and particles will pass on to the inclined screen portion of said screen deck; and wherein said inclined screen portion includes second longitudinal separating bars fixedly attached with respect to one another and spaced apart relative to said vector flow thereby defining second separating apertures between successive said second bars, said second bars between said sieve bend portion and said discharge end defining a generally planar separation surface;

means for fixedly mounting said sieve bond and inclined screen portions with respect to each other and for mounting said combined screen deck to permit for vibratory movement thereof; and vibratory means operatively connected to said screen deck for imparting vibratory movement thereto such that a major vector of said vibratory movement is in a direction generally opposing said vector flow path to partially impede the flow of said slurry mixture across said inclined screen portion so as to establish a layer of concentrated slurry mixture thereon, which layer exhibits a predetermined maximum depth in the vicinity of said discharge end and gradually decreases in an upstream direction, whereby said vibratory means removes an additional amount of said liquid which remains in the slurry mixture as it initially flows onto said inclined screen portion after flowing across said sieve bend portion as said slurry mixture continues to flow along said vector flow path to said discharge end.

16. A vibratory screening apparatus as in claim 1 or 15 further comprising discharge lip means defining a surface having an upstream edge and a downstream edge and including adjusting means for mounting said upstream edge of said discharge lip means adjacent to said discharge end and for permitting said discharge lip means to be adjustably moved to at least one position wherein said surface is in an opposing relationship to said vector flow path, said discharge lip means by virtue of said adjusting means for permitting selective adjustment of said predetermined maximum depth of concentrated slurry mixture in the vicinity of said discharge end.

17. A vibratory apparatus as in claim 16 wherein said inclined screen portion includes flow-impeding means disposed substantially transverse to said vector flow path for establishing at least one localized area of partial impedance to said slurry mixture as it flows along said vector flow path and for establishing, along said localized area, a mass build-up of said slurry mixture having a preselected depth for enhancing removal of said fluid from said slurry mixture.

18. A vibratory apparatus as in claim 17 wherein said flow-impeding means includes (a) means defining an upper edge vertically spaced above said inclined screen portion, said upper edge defining means for establishing said preselected depth of said slurry mixture along said localized area, and (b) adjustment means for mounting said flow-impeding means to said planar screen portion to permit for selective adjustability of said upper edge defining means relative to said inclined screen portion to thereby permit said preselected depth of said slurry mixture along said localized area to be selectively varied.

19. A vibratory apparatus as in claim 15 wherein said inclined screen portion includes flow-impeding means disposed substantially trasnverse to said vector flow path for establishing at least one localized area of partial impedance to said slurry mixture as it flows along said vector flow path and for establishing, along said localized area, a mass build-up of said slurry mixture having a preselected depth for enhancing removal of said fluid from said slurry mixture.

20. A vibratory apparatus as in claim 14 or 19 wherein said flow-impeding means includes (a) means defining an upper edge vertically spaced above said inclined screen portion, said upper edge defining means for establishing said preselected depth of said slurry mixture along said localized area, and (b) adjustment means for mounting said flow-impeding means to said planar screen portion to permit for selective adjustability of said upper edge defining means relative to said inclined screen portion to thereby permit said preselected depth of said slurry mixture along said localized area to be selectively varied.

21. A vibratory apparatus as in claim 1 or 15 wherein said mounting means includes axle rod means for permitting selective pivotal movement of said screen deck to thereby permit inclination selection of said inclined screen portion relative to a horizontal plane.

* * * * *